UNITED STATES PATENT OFFICE.

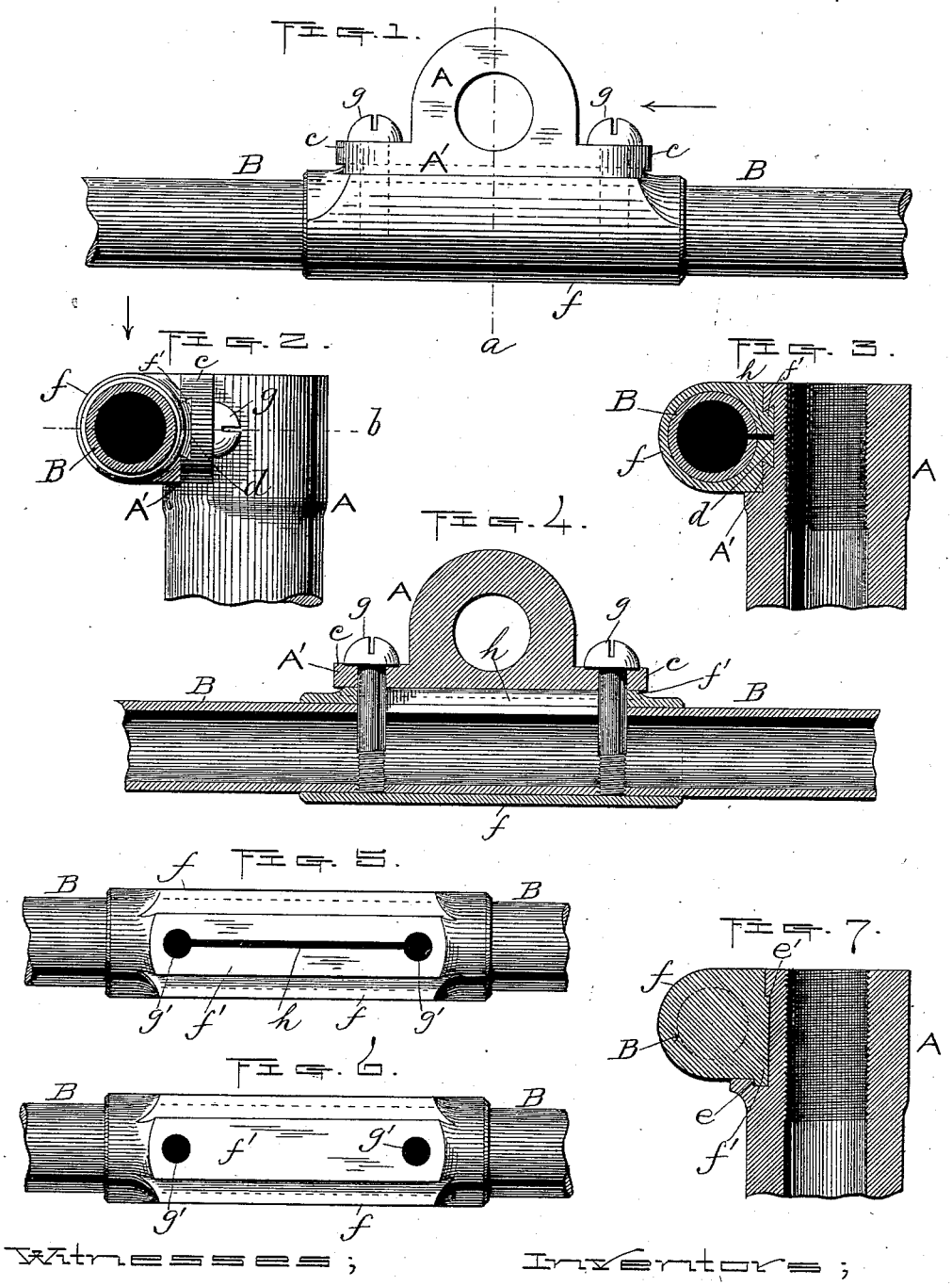

IVER JOHNSON AND REINHARD T. TORKELSON, OF WORCESTER, MASSACHUSETTS; SAID TORKELSON ASSIGNOR TO SAID JOHNSON.

VELOCIPEDE.

SPECIFICATION forming part of Letters Patent No. 379,228, dated March 13, 1888.

Application filed August 1, 1887. Serial No. 245,824. (No model.)

*To all whom it may concern:*

Be it known that we, IVER JOHNSON and REINHARD T. TORKELSON, both of Worcester, in the county of Worcester and State of Massachusetts, have invented certain new and useful Improvements in Velocipedes; and we do hereby declare that the following is a full, clear, and exact description of the same, reference being had to the accompanying drawings, forming a part of this specification, and in which—

Figure 1 represents so much of the head and handle-bar of a bicycle as is necessary to illustrate our improvements thereon. Fig. 2 is a cross or transverse section through the handle bar, showing beyond a side view of the parts illustrated in Fig. 1. Figs. 3 and 4 are vertical and horizontal sections taken on lines $a$ and $b$, respectively, looking in the directions indicated by the arrows, Figs. 1 and 2. Fig. 5 is a detached view of the central portion of our improved handle-bar; and Figs. 6 and 7 are modifications in the construction, hereinafter described.

Our invention is intended mainly for bicycles, but is also applicable to other similar vehicles.

It relates to the handle-bar attachment; and it consists in the construction and arrangement hereinafter described, whereby said handle-bar may be secured in a firm and rigid manner to the head, and at the same time admit of the easy detachment thereof from said head when required.

In order that others may understand our invention, we will now describe the same more fully with reference to the accompanying drawings.

A represents the upper part of the bicycle-head, and B the central part of the handle-bar, both ends thereof being shown broken off at a short distance from its fastening. The head A is provided upon the front side of its upper end with a bearing, A', which projects laterally from said head in opposite directions, as shown at $c\ c$, and has formed in the front side thereof a horizontal longitudinal slot or groove, $d$, extending from end to end of said bearing. The aforesaid groove is preferably made with beveled or "dovetail" edges, as shown in Figs. 2 and 3; but we do not limit ourselves thereto, as other shapes may be adopted to serve the same purpose, as hereinafter described. An illustration of one other way is shown in Fig. 7, which represents said slot or groove with a square vertical shoulder, $e$, at its bottom edge and a square horizontal shoulder, $e'$, at its upper edge.

Upon the handle-bar is centrally secured (preferably by brazing or soldering) a sleeve, $f$, provided with a longitudinal flange or tenon, $f'$, corresponding in shape to the slot or groove in the bearing A', and otherwise formed at each side of the flange to fit the face of said bearing.

In adjusting and fastening the handle-bar to the bearing said handle-bar is held with its flange or tenon $f'$ at one side of and in line with the slot or groove $d$ in said bearing. Then by moving it endwise toward the bearing the tenon is slipped into the groove, as shown in the drawings, after which the two parts may be fastened together in said adjusted position by means of screws or bolts $g\ g$, passed transversely through the same, suitable openings, $g'$, being formed therein for the purpose. Said screws or bolts are preferably inserted from the back side of the bearing through its lateral projections $c\ c$ and extended through the handle-bar up to the opposite inner side of the sleeve, as shown in Fig. 4; but we do not limit ourselves thereto or to the number of such fastening-bolts used.

If desired, a central longitudinal slot, $h$, may be formed in the handle-bar and its sleeve between the bolt-openings $g'$, so that when the bolts are inserted a slight expansion of said parts is admitted of to more securely bind the parts together, the openings for said bolts being in such case made a very close fit, or a trifle small for the bolts, and the flange or tenon a loose fit in the groove, for the above purpose. Another reason for said construction is that by thus obtaining an easy fit of the tenon in in its groove the handle-bar may be readily slipped out or detached from its bearing after removing the outward pressure produced upon the handle-bar by the fastening-bolts, which it is obvious could not be accomplished were there a tight fit made and the parts driven together.

Although the employment of the above-described slot is desirable in practice, it is not essential to the carrying out of our invention, and may therefore be used or not, as desired. In Figs. 6 and 7 we have represented the handle-bar as being made without said slot.

We do not limit ourselves to the use of a hollow handle-bar, our invention being equally applicable made solid, as shown in Fig. 7.

Those skilled in the art to which our invention appertains will perceive from the foregoing description that by the application thereof to practice a very strong and effective handle-bar-fastening device is produced, while at the same time it is capable of detachment in a very easy and expeditious manner.

We are aware of the United States patents to G. Illston, No. 245,071, dated August 2, 1881, and to C. E. Pratt, No. 318,500, dated May 26, 1885, covering improvements in handle-bar attachments, and make no claim to the constructions therein shown, but limit our invention to the specific construction herein set forth.

What we claim as new, and desire to secure by Letters Patent, is—

1. The combination of the velocipede-head having the horizontal dovetail groove $d$ in its front side, with the handle-bar having the longitudinal flange $f'$, corresponding in shape to said groove $d$, and adapted to be slipped endwise therein, said handle-bar also having the longitudinal slot $h$ formed therein, as described, and one or more bolts, $g$, passed transversely through suitable openings in said head and handle-bar, substantially as and for the purpose set forth.

2. The handle-bar B, consisting of a hollow or solid rod having the separate sleeve $f$ secured thereon, provided with the longitudinal flange $f'$, in combination with the head A, having a horizontal slot therein corresponding in shape to the flange on the aforesaid sleeve, also provided with lateral flanges or ears $c\ c$, and fastening-bolts $g\ g$, passed transversely through suitable openings in said flanges, the sleeve, and handle-bar rod, substantially as and for the purpose set forth.

3. The velocipede handle-bar having the sleeve $f$, centrally secured thereon, and said sleeve provided with a longitudinal flange or tenon, $f'$, the handle-bar and sleeve also both having suitable openings therein for the insertion of fastening-bolts, and a longitudinal slot extending through said parts between the aforesaid openings, substantially as set forth.

IVE. JOHNSON.
REINHARD T. TORKELSON.

Witnesses:
ALBERT A. BARKER,
LUCIUS W. BRIGGS.